(No Model.) 2 Sheets—Sheet 2.
W. B. POTTER & F. E. CASE.
TANDEM PARALLEL CONTROLLER FOR INDUCTION MOTORS.
No. 568,458. Patented Sept. 29, 1896.
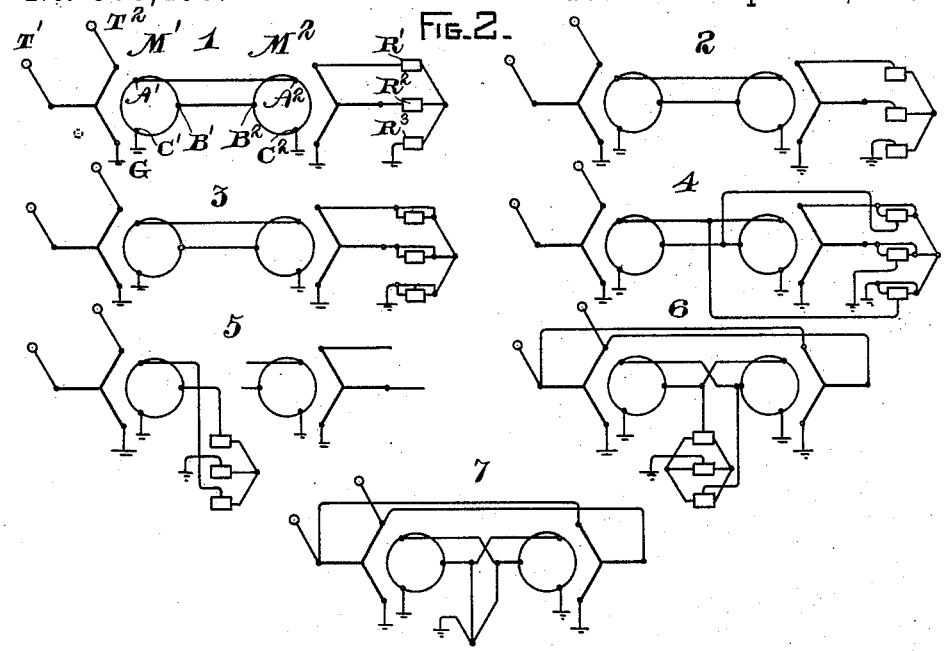
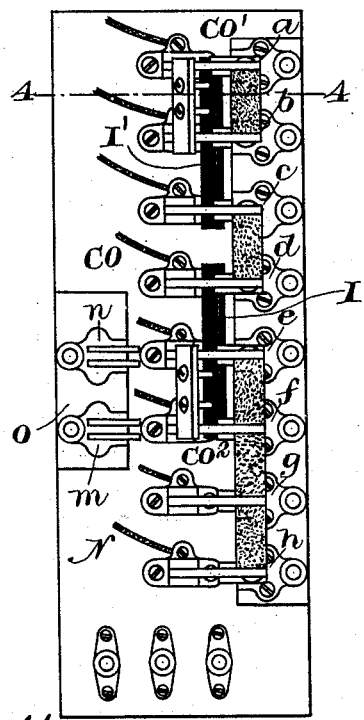
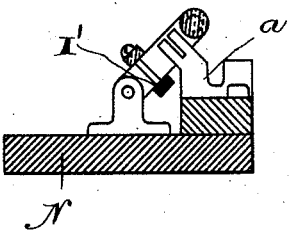
Witnesses:
A. F. Macdonald.
B. B. Hull.
Inventors:
William B. Potter and
Frank E. Case, by
Geo. R. Blodgett,
Atty.

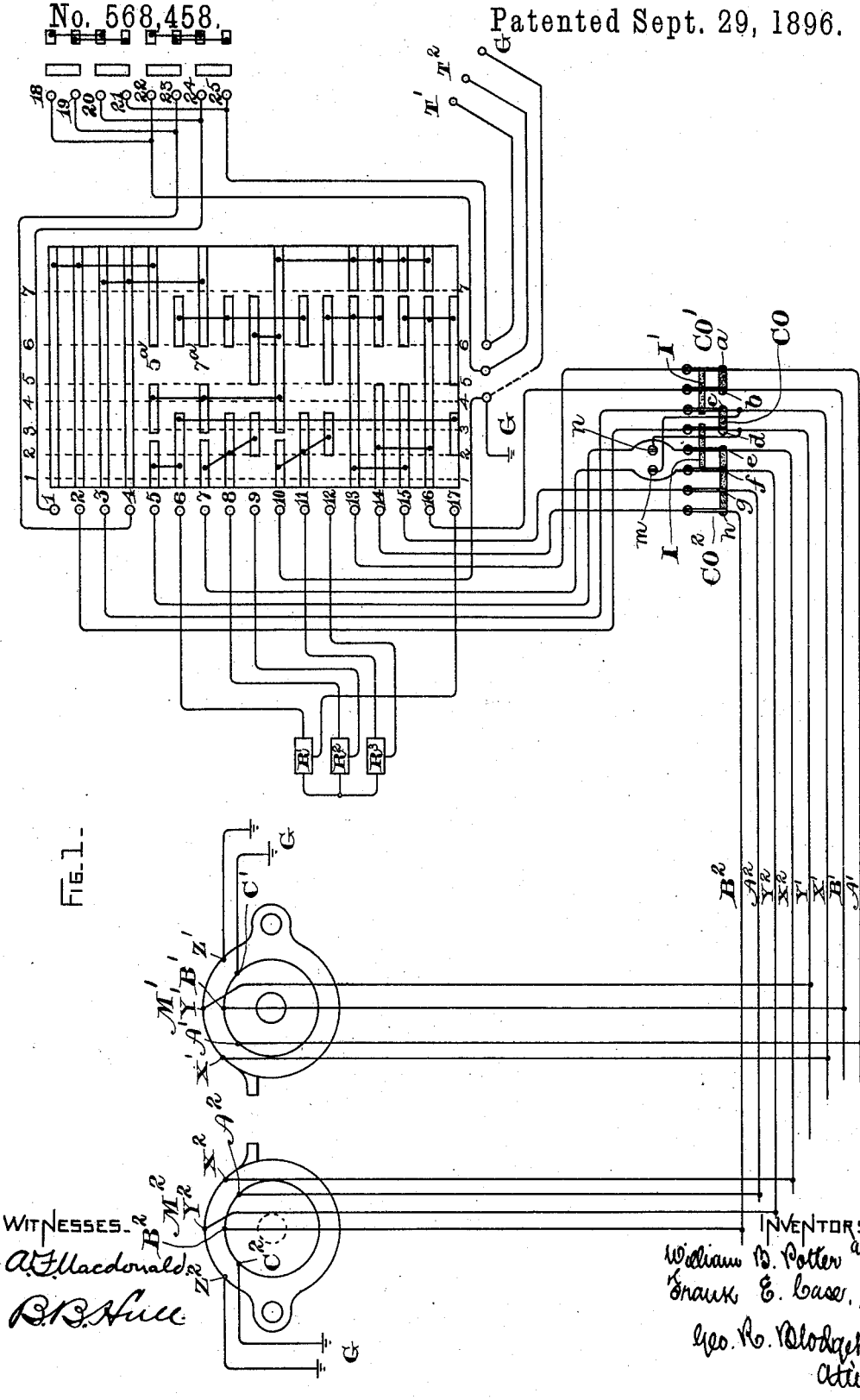

UNITED STATES PATENT OFFICE.

WILLIAM B. POTTER AND FRANK E. CASE, OF SCHENECTADY, NEW YORK, ASSIGNORS TO THE GENERAL ELECTRIC COMPANY, OF NEW YORK.

TANDEM-PARALLEL CONTROLLER FOR INDUCTION-MOTORS.

SPECIFICATION forming part of Letters Patent No. 568,458, dated September 29, 1896.

Application filed August 31, 1895. Serial No. 561,085. (No model.)

*To all whom it may concern:*

Be it known that we, WILLIAM B. POTTER and FRANK E. CASE, citizens of the United States, residing at Schenectady, in the county of Schenectady and State of New York, have invented certain new and useful Improvements in Tandem-Parallel Controllers for Induction-Motors, (Case No. 260,) of which the following is a specification.

Our invention relates to the regulation of alternating-current motors of the induction type, and has for its object to arrange for the control of such motors by the so-called "tandem - parallel" system, resembling in some particulars the series-parallel system of control for continuous-current motors. This system is not new with us, nor is it new with us to arrange a controller adapted to make proper changes in the regulation of motors by the system proposed, such a controller being illustrated in the patent to Albert H. Armstrong, No. 539,404, issued May 21, 1895.

The controller illustrated in the accompanying application is substantially of the type described in that patent, the connections being very slightly changed, so as to simplify its construction; but the particular steps of regulation are the same and are accomplished in substantially the same manner and order. In the system exemplified in that patent it is desirable to arrange for cutting out either one of the motors, should it become disabled for any reason, without affecting the operation of the other, and it is therefore the special object of our invention, as described in this application, to provide cut-out switches by which this operation may be effected in a controller of the class described. The problem presented by such steps as are necessary is not only to cut out either motor without interfering with the operation of the other one, but also to change the inductive relation of the revolving and stationary members of one of the motors, and, further, to so arrange the connections that the motors will come into operation at the same point of revolution of the controller. The necessity for this latter provision will be apparent when it is remembered that in the tandem position (corresponding to the series position of continuous-current motors) the first point of the controller throws both motors into operation. If the second motor be cut out, ordinarily the first motor would come into operation as soon as the controller-handle was moved. As, however, the induced member of one motor and the inducing member of the second motor are the revolving members in this position of the controller and are connected together, it is necessary that the leads of the revolving members should be reversed, so that they may act properly. When the first motor is cut out, therefore, it becomes necessary not only to reverse these leads, but also to provide that no current shall flow in the inducing member or field of the first motor. We therefore so arrange the connections of the cut-out switches in the controller that by the operation of the first cut-out switch the leads to the revolving member of the second motor will be reversed and the circuit of the first motor opened. This adapts the second motor for operation when the controller reaches its first multiple position. To provide for the operation of the first motor in the same manner, we so arrange it that when the second cut-out switch is thrown, open-circuiting the second motor, the connections to the field of the first motor will also be open-circuited until the controller has reached its first multiple position.

The necessity for open-circuiting the field of the motor is apparent, as it is necessary not only to provide for avoiding waste of current and the consequent heating of the field, but also to prevent any false indication in the controller which would tend to confuse the operator. If the field of the idle motor should be left in when the controller was turned to the off position, the spark due to breaking the circuit would indicate that the current was on, and yet the car would not start; whereas, if this field be cut out, the first indications of current flowing will be at the first multiple position of the controller, and the flow of current and the starting of the car will be simultaneous.

The accompanying drawings show an embodiment of our invention.

Figure 1 is a diagrammatic representation of a controller of the type described with our improved cut-out switch, the circuits, motors, and resistances being indicated by conventional signs. Fig. 2 is a series of diagrams, showing the motor combinations effected by the controller. Figs. 3 and 4 are detail views of cut-out switches, Fig. 3 being a front elevation and Fig. 4 a section on the line 4 4 of Fig. 3.

Referring by letter, $M'$ $M^2$ are motors the field-terminals of which are respectively lettered $X'$ $Y'$ $Z'$ and $X^2$ $Y^2$ $Z^2$, the armature-terminals being lettered, respectively, $A'$ $B'$ $C'$ and $A^2$ $B^2$ $C^2$. In this designation we employ the terms "field" and "armature" in their conventional sense, meaning thereby the fixed and revolving elements of the motors. In the case of the motor $M^2$ the revolving element becomes in the first position of the controller the field or inducing element, deriving its current from the armature or induced element of the motor $M'$; but in the multiple position of the controller this arrangement is reversed, and the revolving element becomes the armature or induced element, deriving current only by induction from the fixed or inducing element, which is connected to line in parallel with the fixed part of the motor $M'$. This is all specifically pointed out in the patent already referred to.

The motor combinations are, as already pointed out, substantially the same as in that patent. In Fig. 2 the diagrams illustrate these motor combinations. They are briefly as follows:

In Diagram 1 of Fig. 2 the trolleys feed into the first field, and the armature of the motor $M'$ receives current by induction from that field, feeding the revolving field of the motor $M^2$ by direct connection, which in turn induces in the stationary armature of that motor currents which travel in closed circuits through resistances $R'$ $R^2$ $R^3$. The next step of the controller (illustrated in Diagram 2 of Fig. 2) shows the resistances partly cut out or short-circuited. In the next step (shown in Diagram 3) the resistances are entirely short-circuited, and this is the running tandem position. Diagram 4 is the transition step, the leads of the second motor being reversed and the motor shunted through a part of the resistances. In Diagram 5 the second motor is open-circuited and the armature of the first motor is closed through resistances. In Diagram 6 the motors are connected in parallel and their armatures closed through part of the resistances. In Diagram 7 the final running position is shown, the fields being in parallel and the armatures being closed-circuited without the resistances.

Now, referring again to Fig. 1, we do not find it necessary to trace the circuits entirely, inasmuch as, as already pointed out, they are illustrated and described fully in the patent to Armstrong already referred to. The trolleys are lettered $T'$ $T^2$. A third trolley G is also indicated as connected by a dotted line, by which we mean to indicate that the system may have three metallic circuits instead of having a ground connection, as illustrated, this forming no limiting feature of our invention. The contacts of the controller are numbered 1 to 17, respectively; those of the reversing-switch 18 to 25, respectively. The different positions of the controller are also indicated by the dotted lines 1 to 7, corresponding to the diagrams in Fig. 2.

It will be observed that the current enters from the trolley $T'$, passing to the contact 25 on the reversing-switch, and then around to the contact 1, which is the first trolley-contact. In order to exemplify the application of our invention to the controller, we trace the first circuit as follows: from the trolley $T'$, through the reversing-switch, as just pointed out, to contact 1; thence by cross connection of the two contact-plates to the contact 2; thence through the cut-out switch at the contact $d$ on that switch, passing to the terminal $Y'$ upon the motor $M'$. There the current divides, passing through the field, and leaves the field by two paths, one through the terminal $X'$, back to the lead $c$ of the cut-out switch $CO'$, then to the contact 3 upon the controller, by cross connection of the contact-plates to contact 4, and out through the contacts 23 and 22 on the reversing-switch to the trolley $T^2$. The other path of the current is from the terminal $Z'$ to ground, and thus back to the generator, or, in the case of a metallic circuit, by a wire directly back to the trolley G. No current passes directly from the controller to the motor $M^2$, but the induced currents from the revolving member of the motor $M'$ reach the revolving induced member of the motor $M^2$, as follows: Starting from the terminal $A'$, it passes to the contact $a$ of the cut-out switch $CO'$, thence to the contact 13 upon the controller, by cross connection of the contact-plates to contact 15, thence through the terminal $g$ of the cut-out switch $CO^2$, directly to the terminal $A^2$ upon the motor $M^2$. Similarly, the terminal $B'$ upon the motor $M'$ is connected to the terminal $b$ of the cut-out switch $CO'$, to contact 16 upon the controller, and by cross connection of the contact-plates to contact 14, through the terminal $h$ to the cut-out switch $CO^2$, directly to the terminal $B^2$ of the motor $M^2$. The terminals $C'$ $C^2$ of the respective motors are connected through the ground or by a direct metallic connection. As may readily be seen from an inspection of the connections, the terminals $X^2$ $Y^2$ $Z^2$ are closed through the resistances $R'$ $R^2$ $R^3$.

Before describing the operation of the cut-out switches we will describe their construction, as illustrated in Figs. 3 and 4. In Fig. 3, N is a base of any suitable insulating material. The terminals of the switches are lettered $a$ to $h$, respectively. The upper two terminals constitute the first cut-out switch $CO'$. The four lower terminals form the cut-out switch $CO^2$. The terminals $c$ $d$, with their blades, form the switch CO. Bars of insulating material I I' are shown. The lower cut-out switch is provided with the bar I, the upper with the bar I', and each of these bars is so arranged that by throwing either of the cut-out switches $CO'$ $CO^2$ the intermediate switch CO will also be thrown. Back contacts $m$ $n$ are provided for two of the blades of the cut-out switch $CO^2$, and these contacts are mounted on the block O.

Referring again to Fig. 1, the operation of the switch which we have just described may be deduced from an examination of the circuits. It will be seen from the description of the first circuit which we have given that contacts 2 and 3 upon the controller are the starting-points for current to the motors, they communicating, respectively, with the terminals $Y'$ $X'$ of the motor M', and therefore if these contacts are open-circuited no current will flow in either of the motors. We therefore so arrange our cut-out switches that whichever motor is cut out these two contacts shall remain open-circuited until the multiple position of the controller is reached, the reasons for which have been fully pointed out in our statement of invention. These two contacts connect with the central switch CO, and it is this switch which the bars of insulation I I' open as the other cut-out switches are thrown. The corresponding parts are indicated in Fig. 1, and the terminals $c$ $d$ are the ones which are opened when this intermediate switch is thrown. The switch is, however, cross-connected to the back contacts $m$ $n$, and it is by this cross connection that we not only open-circuit the first motor-field, for the reasons already pointed out, but also, when the second cut-out switch is thrown, reverse the leads of the revolving member of the motor $M^2$. The essential parts of the controller entering into this operation are the contact-plates $5^a$ $7^a$, which serve to again close the circuit of the contacts 2 and 3, which, until the controller reaches this (the sixth) position, remain open.

Assume, first, that the cut-out switch CO' is thrown, opening the circuit at contacts $a$ $b$ $c$ $d$, respectively. It will be seen that the terminals of the first motor A' B' X' Y' are opened and the motor is necessarily idle, no current flowing in either the field or armature. In this position the motor $M^2$ is also cut out, inasmuch as it can get no current in the tandem position, but as soon as the controller has been revolved to the sixth position the contact-plates $5^a$ $7^a$, which are cross-connected, respectively, to the trolleys 1 and 4, complete the circuit through the contacts 5 and 7, the circuit from each passing to the contacts $e$ $f$, respectively, and from thence to the terminals $X^2$ $Y^2$, respectively, of the motor $M^2$. With the first motor cut out, therefore, the second motor takes current only from the multiple position of the controller. Assume now that the cut-out switch $CO^2$ is thrown. This open-circuits the contacts $e$ $f$ $g$ $h$, thus, as in the case of the motor M', opening the terminals of the motor $M^2$ and putting it out of action. The bar I also opens the contacts $c$ $d$, and at the same time the back contacts $m$ $n$ are closed by the switch-blades of the cut-out switch $CO^2$, and thus the current passes directly from the trolley-contact 1 to the contact-plate $5^a$, then out over the contact 5 and its lead to the switch-blade corresponding to the contacts $e$ on the cut-out switch $CO^2$, thence to the back contact $m$, and thence by the lead to the terminal Y' of the motor M', returning from the terminal X' through the lead to the contact $n$, thence over the switch-blade and by the lead to the contact 7, contact-plate $7^a$, and by cross connection of the contact-plates to the contact 4, thence by the contacts 23 and 22 upon the reversing-switch to the trolley $T^2$. The path from the terminal Z' of the motor M' is, as before, directly to ground or to the trolley G. As indicated in Diagram 6 of Fig. 2, in the multiple positions only a portion of the resistances are used, and this is the case when the cut-out switches are thrown.

In the sixth position of the controller the paths from the terminals A' B' C' of the motor M' to the resistances are as follows: from the terminal A' to the cut-out switch CO' at the contact $a$, thence to contact 13 upon the controller, by cross connection of the contact-plates to the contact 12, to an intermediate point of the resistance $R^3$. Again, starting from the terminal B' of the motor, the lead goes to the contact $b$ of cut-out switch CO', thence to the contact 16 upon the controller, by cross connection of the contact-plates to contact 17, and to an intermediate point of the resistance R'. From the terminal C' the path is to ground, reëntering the controller at the contact 10 by cross connection of the contact-plates to contact 9, to an intermediate point of the resistance $R^2$, thus closing the circuit of the armature through the resistances. The next step of the controller is after the dotted line 7 has been reached, acting to cut out the resistance and run the armature upon short circuit.

So far as we are aware we are the first to devise cut-out switches of any type for induction-motors operated by the tandem-parallel system of control. It is manifest that other arrangements might be devised which would accomplish the purposes of our invention, and it is our object to make broad claims.

What we claim as new, and desire to secure by Letters Patent of the United States, is—

1. In a controller for induction-motors, contacts and cross connections adapted to connect the motors in tandem or parallel at will, and cut-out switches arranged to cut out part of the motors without affecting the operation of the remainder.

2. In a controller for induction-motors, contacts and cross connections for regulating the speed and torque of the motors, and cut-out switches adapted to cut out either one of the motors without affecting the operation of the other.

3. In a tandem-parallel controller for induction-motors, contacts and connections for regulating the speed of the motors in various combinations of tandem and parallel, and cut-out switches adapted to cut out either motor at will, the contacts being so arranged that the current is turned on at the same point in the operation of the controller with either motor cut out.

4. A tandem-parallel controller for induction-motors, comprising contacts and connections adapted to connect the motors in tandem or parallel, and cut-out switches in combination therewith arranged to cut out either motor at will, and to open the circuit until the multiple position of the controller is reached with either motor cut out.

5. A tandem-parallel controller for induction-motors, comprising contacts and connections for connecting the motors in tandem or parallel, a cut-out switch for the first motor acting to disconnect the second motor until the multiple position of the controller is reached, and a cut-out switch for the second motor disconnecting the first motor until the multiple position is reached, the cut-out switch for the first motor acting also to reverse the leads of the inducing element of the second motor.

In witness whereof we have hereunto set our hands this 27th day of August, 1895.

WILLIAM B. POTTER.
FRANK E. CASE.

Witnesses:
A. F. MACDONALD,
B. B. HULL.